(12) United States Patent
Viegas et al.

(10) Patent No.: US 10,750,020 B2
(45) Date of Patent: Aug. 18, 2020

(54) SYSTEMS, METHODS AND COMPUTER PROGRAM PRODUCTS FOR VOICE CALL CUSTOMER SUPPORT

(71) Applicant: MASTERCARD INTERNATIONAL INCORPORATED, Purchase, NY (US)

(72) Inventors: Rukuma Viegas, Pune (IN); Rajesh Pralhadrao Mahalle, Pune (IN); Arunmurthy Gurunathan, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/569,985

(22) Filed: Sep. 13, 2019

(65) Prior Publication Data

US 2020/0120210 A1   Apr. 16, 2020

(30) Foreign Application Priority Data

Oct. 16, 2018   (IN) .............................. 201811039282

(51) Int. Cl.

| | |
|---|---|
| *H04M 3/51* | (2006.01) |
| *G10L 15/22* | (2006.01) |
| *G06Q 30/00* | (2012.01) |
| *G06F 40/205* | (2020.01) |
| *G06F 16/903* | (2019.01) |
| *G10L 15/30* | (2013.01) |
| *G10L 15/18* | (2013.01) |
| *G06Q 20/34* | (2012.01) |

(52) U.S. Cl.
CPC .... *H04M 3/5183* (2013.01); *G06F 16/90335* (2019.01); *G06F 40/205* (2020.01); *G06Q 20/34* (2013.01); *G06Q 30/016* (2013.01); *G10L 15/1822* (2013.01); *G10L 15/22* (2013.01); *G10L 15/30* (2013.01)

(58) Field of Classification Search
CPC .... H04M 3/5183; G10L 15/22; G06F 40/205; G06Q 30/016
USPC .............. 379/265.09, 265.05, 265.11, 266.1, 379/265.01, 242
See application file for complete search history.

(56) References Cited

U.S. PATENT DOCUMENTS

| | | | |
|---|---|---|---|
| 8,510,116 B1 * | 8/2013 | Moy ................ | G06Q 20/40145 704/246 |
| 2003/0115056 A1 | 6/2003 | Gussler et al. | |
| 2003/0204492 A1 | 10/2003 | Wolf et al. | |

(Continued)

*Primary Examiner* — Thjuan K Addy
(74) *Attorney, Agent, or Firm* — Jordan IP Law, LLC

(57) ABSTRACT

The invention provides systems, methods and computer program products for providing optimized customer support over data networks. In an embodiment the invention comprises implementing within a processor based computing system, the steps of (i) receiving voice data from a customer through a client terminal, (ii) converting the received voice data to text data, (iii) extracting one or more search parameters from the converted text data, wherein said extracted search parameters are based on at least one of a context or a subject identified from the converted text data, (iv) retrieving from a customer record database, at least one customer record that matches the extracted one or more search parameters, and (v) transmitting the retrieved at least one customer record to a customer service representative terminal for display to a customer service representative.

10 Claims, 12 Drawing Sheets

(56) References Cited

U.S. PATENT DOCUMENTS

| | | |
|---|---|---|
| 2009/0164214 A1 | 6/2009 | Baciu et al. |
| 2014/0171034 A1 | 6/2014 | Aleksin et al. |
| 2015/0350430 A1* | 12/2015 | Nowak ............... H04M 3/5175 379/265.09 |
| 2016/0191709 A1* | 6/2016 | Pullamplavil ....... H04M 3/5133 379/266.07 |

* cited by examiner

| Data Record(s) Associated with Customer Account | |
|---|---|
| Customer ID | |
| Customer Profile Information | |
| Authentication Information | |
| Customer Purchase Records | |
| Customer Interaction Records | |
| Other data | |

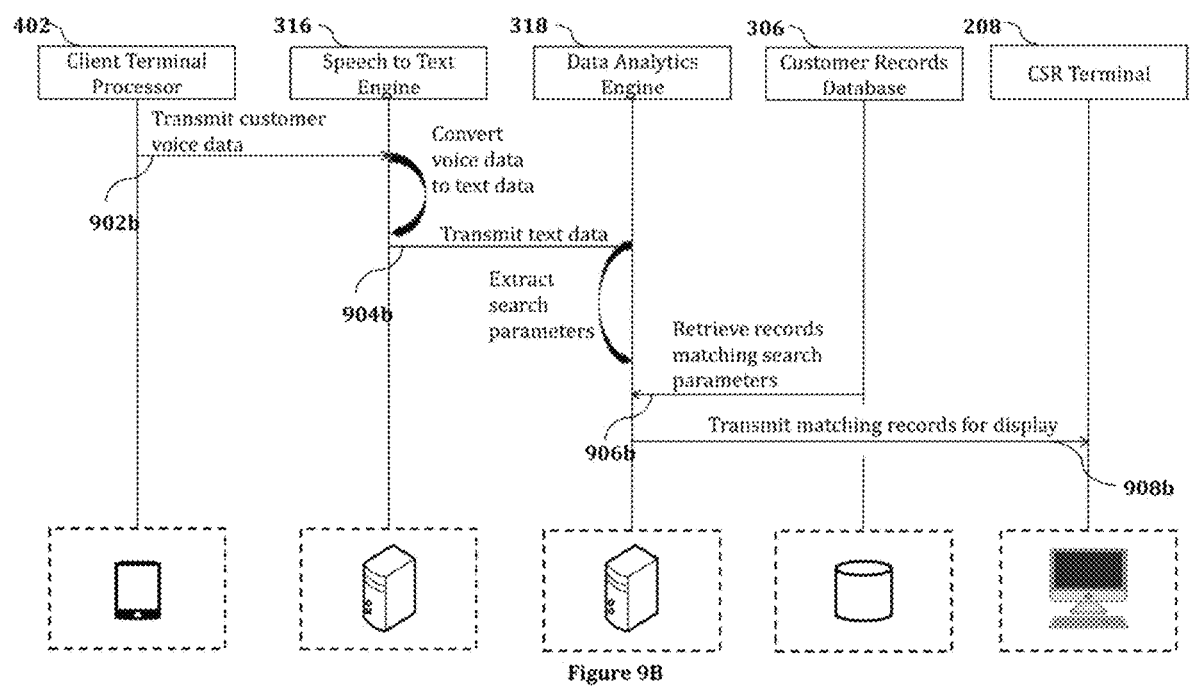

008# SYSTEMS, METHODS AND COMPUTER PROGRAM PRODUCTS FOR VOICE CALL CUSTOMER SUPPORT

CROSS-REFERENCE TO RELATED APPLICATIONS

The present application claims priority to Indian Patent Application No. 201811039282 (filed on Oct. 16, 2018), which is hereby incorporated by reference in its entirety.

FIELD OF THE INVENTION

The invention relates to the provision of customer support solutions. In particular, the invention provides systems, methods and computer program products for providing optimized voice call based customer support over data networks.

BACKGROUND

Conventionally, customer support services have been enabled through voice telephony based support centers (e.g. call centers)—whereby customer service representatives converse with customers through voice network communications to resolve customer problems and provide technical support. Over time, some support services have migrated from traditional public switched telephone networks (PSTN) to data networks that utilize text based or Voice over Internet Protocol (VoIP) communication to facilitate communication between customers and customer service representatives. Software applications (for example computer applications or mobile communication device applications) that permit for direct text or voice based messaging between a customer and a customer service representative are also increasingly common.

It has however been found that customers and customer service representatives frequently have difficulties understanding each other, owing in part to voice quality issues, and more commonly due to differences in accents, pronunciation, speech patterns and speech cadences.

Additionally, typical interactions between customers and customer service representatives require one or both parties to be able to access data records that are relevant to the issues under discussion—for example documents relating to product or service purchases, payments, payment receipts, terms and conditions, warranties and prior communications between parties.

A significant amount of time in any session between a customer and customer service representative is spent in deciphering speech of the other party, identifying relevant documents or data records, and each party trying to locate/access the documents or data records referred to by the other. This has been found to be a significant contributor to customer dissatisfaction—and has also been found to reduce the efficiency with which a customer service representative is able to address a customer's problems.

There is accordingly a requirement for solutions that provide more effective and convenient techniques, and instant communication based customer support services that address the above problems.

SUMMARY

The invention provides systems, methods and computer program products for providing optimized customer support over data networks.

The invention provides a method for implementing a voice call based customer support solution. The method comprises implementing within a processor based computing system the steps of (i) receiving voice data from a customer through a client terminal, (ii) converting the received voice data to text data, (iii) extracting one or more search parameters from the converted text data, wherein said extracted search parameters are based on at least one of a context or a subject identified from the converted text data, (iv) retrieving from a customer record database, at least one customer record that matches the extracted one or more search parameters, and (v) transmitting the retrieved at least one customer record to a customer service representative terminal for display to a customer service representative.

In a method embodiment, the customer record database is located within the client terminal. At least one of the steps of converting the received voice data to text data, extracting one or more search parameters from the converted text data, and retrieving at least one customer record from the customer record database may be implemented within a service interface server that is in network communication with the client terminal. At least one of the steps of converting the received voice data to text data, extracting one or more search parameters from the converted text data, and retrieving at least one customer record from the customer record database may be implemented within the client terminal.

In a particular method embodiment, the retrieved at least one customer record is transmitted to a customer service representative in response to receiving through the client terminal, prior customer approval for such transmission.

The search parameters extracted from the converted text data may comprise one or more of a customer ID, customer name, serial number or order number for a product or service, date of purchase, date of service provision, date of prior complaint, invoice number, and payment amount associated with the customer.

In a specific embodiment of the method, (i) the voice call based customer support solution provides customer support for payment card based or electronic payment account based transaction services, (ii) the at least one customer record corresponds to a transaction record associated with a payment card or electronic payment account associated with said payment card based or electronic payment account based transaction services, (iii) the search parameters extracted from the converted text data comprise one or more of a customer ID, a payment card ID, an electronic payment account ID, cardholder name, electronic payment accountholder name, transaction statement number, transaction statement date, reward information associated with said payment card or electronic payment account, payment amount disputed by customer, and payment item disputed by customer, and (iv) the step of retrieving at least one customer record from the customer record database is implemented within the client terminal.

The invention additionally provides a voice call based customer support system, comprising a processor based system configured to (i) receive voice data from a customer through a client terminal, (ii) convert the received voice data to text data, (iii) extract one or more search parameters from the converted text data, wherein said extracted search parameters are based on at least one of a context or a subject identified from the converted text data, (iv) retrieve from a customer record database, at least one customer record that matches the extracted one or more search parameters, and (v) transmit the retrieved at least one customer record to a customer service representative terminal for display to a customer service representative.

The processor based system may comprise a server that is in network communication with the client terminal, the server including at least one of (i) a speech to text engine configured for converting the received voice data to text data, and (ii) a data analysis engine configured for extracting one or more search parameters from the converted text data, and retrieving at least one customer record from the customer record database.

In an embodiment of the system, (i) the customer record database is located within the client terminal, (ii) the client terminal is configured for one or more of converting the received voice data to text data, extracting one or more search parameters from the converted text data, and retrieving at least one customer record from the customer record database implemented within said client terminal, and (iii) the processor based system is configured to transmit the retrieved at least one customer record to a customer service representative in response to receiving through the client terminal, prior customer approval for such transmission.

The processor based system may be configured such that the search parameters extracted from the converted text data comprise one or more of a customer ID, customer name, serial number or order number for a product or service, date of purchase, date of service provision, date of prior complaint, invoice number, and payment amount associated with the customer.

In an embodiment of the invention, the voice call based customer support solution may be configured such that (i) the voice call based customer support solution is configured to provide customer support for payment card based or electronic payment account based transaction services, (ii) the at least one customer record corresponds to a transaction record associated with a payment card or electronic payment account associated with said payment card based or electronic payment account based transaction services, (iii) the search parameters extracted from the converted text data comprise one or more of a customer ID, a payment card ID, an electronic payment account ID, cardholder name, electronic payment accountholder name, transaction statement number, transaction statement date, reward information associated with said payment card or electronic payment account, payment amount disputed by customer, and payment item disputed by customer, and (iv) the step of retrieving at least one customer record from the customer record database, is implemented within the client terminal.

The invention additionally provides a computer program product for implementing a voice call based customer support solution. The computer program product comprises a non-transitory computer usable medium having a computer readable program code embodied therein, the computer readable program code comprising instructions for implementing within a processor based computing system, the steps of (i) receiving voice data from a customer through a client terminal, (ii) converting the received voice data to text data, (iii) extracting one or more search parameters from the converted text data, wherein said extracted search parameters are based on at least one of a context or a subject identified from the converted text data, (iv) retrieving from a customer record database, at least one customer record that matches the extracted one or more search parameters, and (v) transmitting the retrieved at least one customer record to a customer service representative terminal for display to a customer service representative.

BRIEF DESCRIPTION OF THE ACCOMPANYING DRAWINGS

FIG. 5B illustrates an exemplary data structure that may be used to store customer information within a customer records database.

FIG. 9B is a communication flow diagram illustrating communication flows involved in the method of FIG. 8 of the present invention.

DETAILED DESCRIPTION

The present invention is directed towards providing optimized customer support over data networks.

Figure 1:
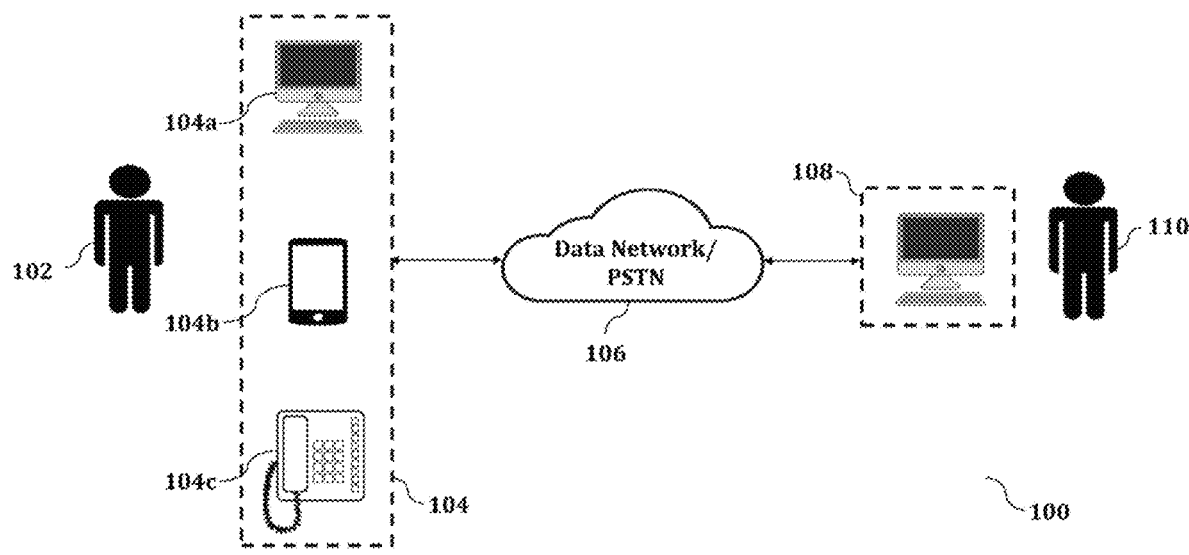
FIG. 1 illustrates a system environment of a kind typically used to implement prior art customer service solutions.

FIG. 1 illustrates a prior art system environment 100 of a type used to implement prior art customer service solutions. System environment 100 comprises a customer 102 having access to a client terminal 104. Client terminal 104 may comprise any communication terminal configured for network based communication—which may include one or both of voice communication and data communication. In various embodiments, client terminal 104 may comprise a desktop computer 104a configured for data and/or voice communication, a mobile communication device 104b configured for voice and/or data communication, or a wired line device 104c configured for voice and/or data communication.

Client terminal 104 is configured for network based voice or data communication through network 106. The network 106 may in certain embodiments comprise a data network (for example the internet) or a public switched telephone network (PSTN).

Network 106 serves as a communication intermediary between client terminal 104 and a customer service representative terminal (CSR terminal) 108 that is operated by customer service representative 110. CSR terminal 108 may comprise a computing device configured to enable one or both of voice and data communication—and may be in network communication with client terminal 104. As a result, customer 102 and customer service representative 110 are able to communicate with each other to resolve the customer's problems.

Figure 2:
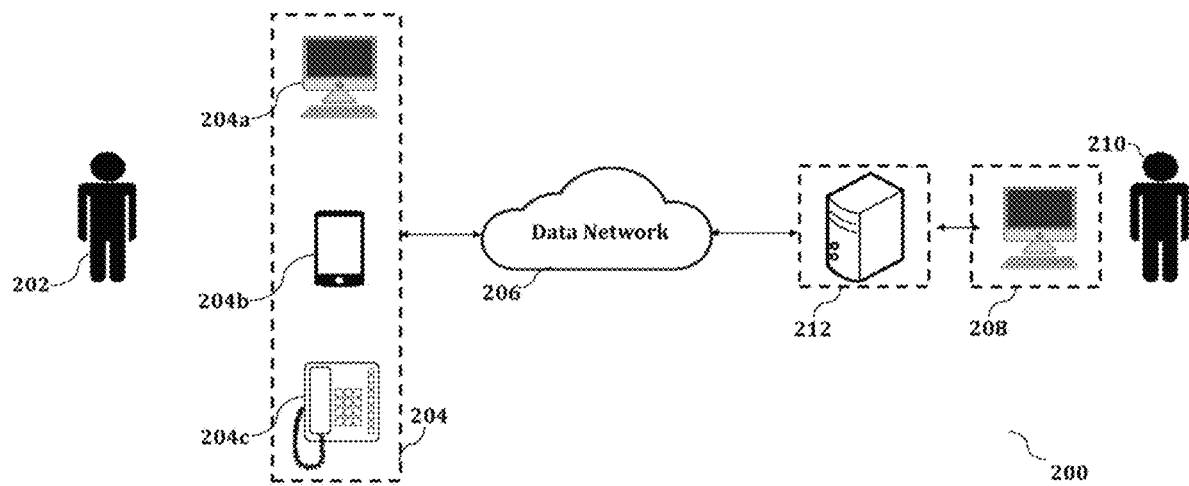
FIG. 2 illustrates an embodiment of a system environment configured for implementing the present invention.

FIG. 2 illustrates an embodiment of a system environment 200 that is configured for implementing the present invention. System environment 200 comprises a customer 202 having access to a client terminal 204. Client terminal 204 may comprise any communication terminal configured for network based voice and data communication. In various embodiments, client terminal 204 may comprise a desktop computer 204a configured for data and voice communication, a mobile communication device 204b configured for voice and data communication, or a wired line device 204c configured for voice and data communication.

Client terminal 204 is configured for network based voice and data communication through network 206—which is a data network such as the internet. Client terminal 204 may in various embodiments include any of a desktop computer, a laptop computer, a mobile communication device such as a smartphone or a feature phone, a voice over internet protocol (VoIP) device, a tablet device etc.

Network 206 serves as a communication intermediary between client terminal 204 and service interface server 212, which service interface server 212 is in turn communicably coupled with a CSR terminal 208 that is operated or accessed by customer service representative 210. CSR terminal 208 may comprise a computing device configured to enable voice and data communication between customer service representative 210 and customer 202, through service interface server 212—and may in various embodiments include any of a desktop computer, a laptop computer, a mobile communication device such as a smartphone or a feature phone, a voice over internet protocol (VoIP) device, a tablet device etc.

The specific configurations of components of system environment 200 and the manner in which the present invention is implemented within system environment 200 are discussed in detail hereinbelow.

Figure 3:
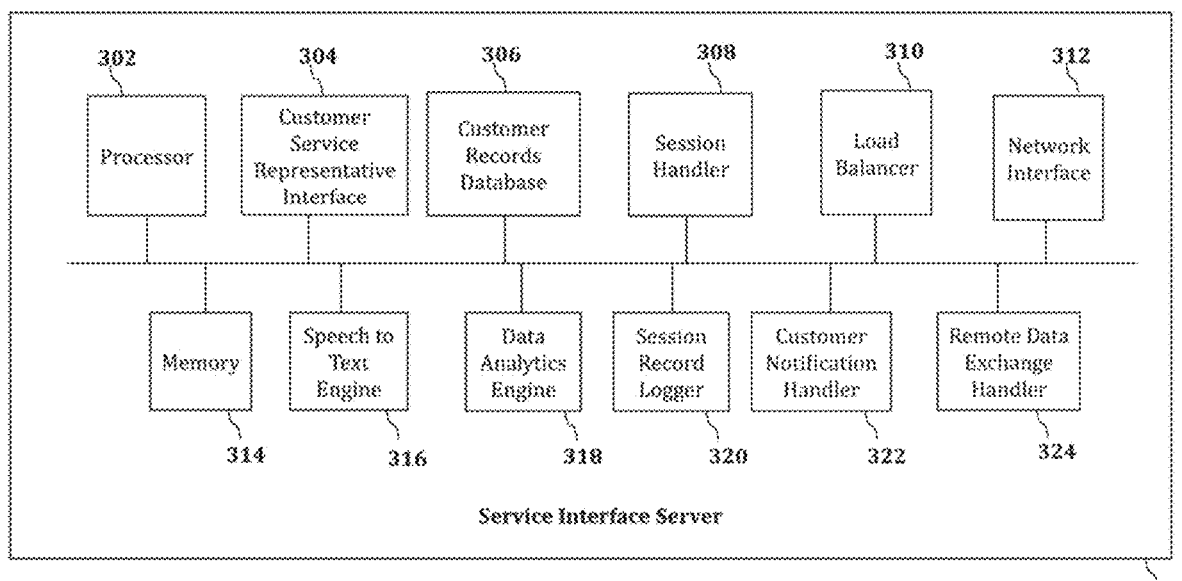
FIG. 3 illustrates an exemplary service interface server of a type that is configured for implementing the present invention.

FIG. 3 illustrates an embodiment of service interface server 212, comprising components 302 to 324. As shown in FIG. 3, service interface server 212 includes (and in an optional embodiment, includes only some of) processor 302, customer service representative interface 304, customer records database 306, session handler 308, load balancer 310, network interface 312, memory 314, speech to text engine 316, data analytics engine 318, session record logger 320, customer notification handler 322 and remote data exchange handler 324. The configuration and functionality of the above components is described in more detail in connection with FIGS. 5A to 9B.

Figure 4:
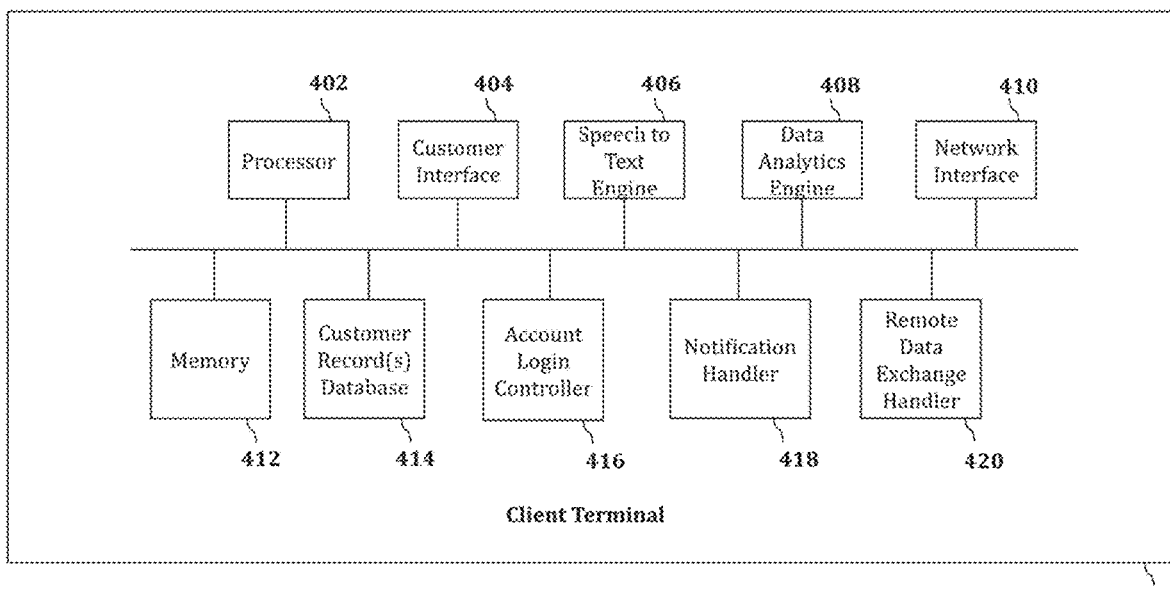
FIG. 4 illustrates an exemplary client terminal of a type that is configured for implementing the present invention.

FIG. 4 illustrates an embodiment of client terminal 204, comprising components 402 to 420. As shown in FIG. 4, client terminal 204 may include at least one of (and preferably more than one of) processor 402, customer interface 404, speech to text engine 406, data analytics engine 408, network interface 410, memory 412, customer record(s) database 414, account login controller 416, notification handler 418 and remote data exchange handler 420. The configuration and functionality of the above components is also described in more detail in connection with FIGS. 5A to 9B.

Figure 5A:
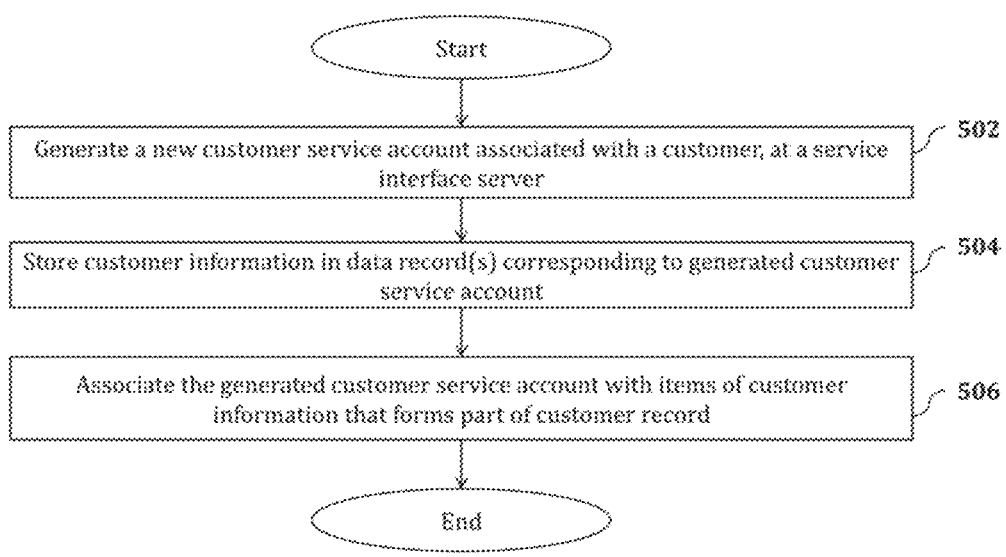
FIG. 5A is a flowchart illustrating a method for generating a customer account at a service interface server, in accordance with the present invention.

FIG. 5A comprises a flowchart illustrating a method of creating a customer service account at service interface server 212.

Step 502 of FIG. 5A comprises generating at service interface server 212, a customer service account associated with a customer of a product or service provided by a vendor/service provider that uses the service interface server 212 of the present invention for the purposes of providing a customer service solution to its customers.

In an embodiment, the customer service account may be generated in response to a request for creation of an account being received from either client terminal 204 or from a CSR terminal 208—which request may have been transmitted by client terminal 204 or CSR terminal 208 pursuant to instructions from the requesting customer 202/requesting customer service representative 210 that is operating the terminal. In an embodiment where the request for creation of the account is received from a client terminal 204, the request is received at network interface 312 through network 206, and is passed on to processor 302 for account generation. In an embodiment where the request for creation of the account is received from a customer service representative terminal 208, the request may be received at a customer service representative interface 304 and passed on to processor 302 for account generation.

Processor 302 may generate the requested customer service account—and at step 504, information corresponding to the generated customer service account may be stored in customer records database 306 of service interface server 212. In an embodiment, storing of information in customer records database 306 at step 504 may be implemented by processor 302.

Step 506 comprises associating the generated customer service account with one or more items of customer information that forms part of the customer record of the concerned customer. In an embodiment, said step of associating the generated customer service account with items of customer information may be implemented by processor 302. The items of customer information may include in various embodiments, one or more of, a customer ID/login ID generated by processor 302 and associated with the generated account, customer authentication information that enables authentication of the customer as a pre-requisite to login (for example one or more passwords, passcodes, or biometric feature templates associated with the customer), customer profile information (for example, bibliographic or demographic information concerning the customer) and any other information/records that may be necessary for ascertaining/verifying the identity of a customer. The above described items of information may in an embodiment be stored in customer records database 306 within service interface server 212.

Once the customer service account has been generated, the account can be used to stored data records and information corresponding to the customer's interactions with the vendor/service provider/customer service representative(s), including without limitation, dates on which goods or services have been availed, copies of documentation, receipts and payment records associated with the availed goods or services, customer complaint records etc.

FIG. 5B illustrates an exemplary data structure 500 that may be used to store data records associated with a customer service account that has been generated in accordance with the method of FIG. 5A (for example, within customer records database 306). As shown in FIG. 5B, data structure 500 may include data fields or data records configured to enable storage of one or more of (i) a customer ID used to identify a customer account, (ii) customer profile information that has been associated with the customer service account, (iii) customer authentication information, (iv) customer purchase records, (v) customer interaction records, and (vi) any other customer data or information that has been associated with the customer service account.

Figure 6:
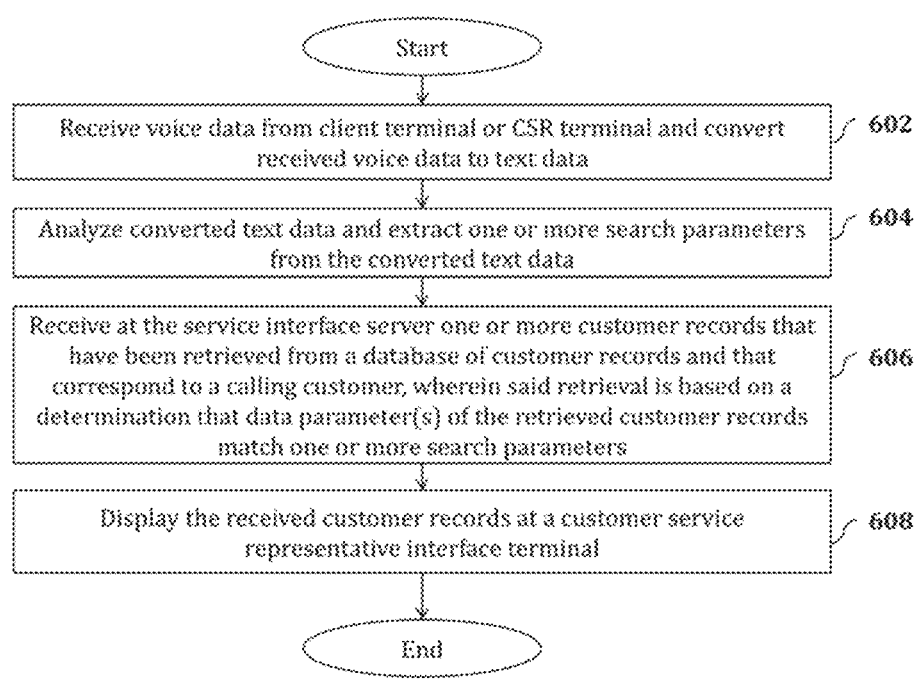
FIG. 6 is a flowchart illustrating a method of using speech data to retrieve and display relevant customer records to a customer service representative.

FIG. 6 is a flowchart illustrating a method for retrieving and providing relevant customer information to a customer service representative during a customer support session. The method of FIG. 6 may be implemented in the course of a voice call between a customer and a customer service representative within the system environment 200 of FIG. 2.

As a preliminary to the method steps of FIG. 6, a customer 202 may initiate a voice call through client terminal 204 to a customer service number. The voice call may be transmitted by client terminal 204 over a voice network or as a VoIP call over a data network and may be routed to service interface server 212. Load balancer 310 within service interface server 212 routes the call to a particular customer service representative 210 or a particular CSR terminal 208 within a group of customer service representatives or CSR terminals—based on one or more load balancing routines. Session handler 308 thereafter completes a voice connection between client terminal 204 and CSR terminal 208 via service interface server 212.

Step 602 comprises receiving voice data from at least one of client terminal 204 (i.e. voice data corresponding to the customer) and CSR terminal 208 (i.e. voice data corresponding to the customer service representative), and converting the received voice data to text data. In one embodiment, the voice data may be received for conversion at a processor 402 within client terminal 204. In another embodiment, the voice data may be received for conversion at a processor 302 within service interface server 212. The conversion of voice data to text data may be implemented by a speech to text engine (in an embodiment, speech to text engine 316 or 406) which may be implemented either within client terminal 204 (in an embodiment, by speech to text engine 406) or within service interface server 212 (in an embodiment, by speech to text engine 316). The speech to text engine 316, 406 may be configured to receive voice data, analyze such voice data, extract speech content from the received voice data, and convert the voice data to text data.

In various embodiments of the invention, the converted text data may be displayed on one or both of client terminal 204 and CSR terminal 208. In specific embodiments, the speech to text conversion may be triggered or initiated in response to receiving a specific instruction for initiating the speech-to-text conversion from either the client terminal 204 or CSR terminal 208. Display of text data corresponding to speech data on the CSR terminal or the client terminal would improve the likelihood that either/both parties to the conversation fully comprehend what the other party is saying—despite differences in accents, pronunciation, speech patterns, speech cadences etc.

Step 604 comprises analyzing the converted text data and extracting one or more search parameters from the converted text data. The analysis of text data and extraction of search parameters from the converted text data may be implemented by one or more data analytics engines (in an embodiment, data analytics engine 318 or 408) that may be located within one or both of client terminal 204 (in an embodiment, data analytics engine 408) and service interface server 212 (in an embodiment, data analytics engine 318). In an embodiment, the analysis and extraction of step 604 may comprise context based analysis and extraction, wherein the data analytics engine is configured to identify one or more contexts or subjects of the discussion between the customer and the customer service representative, and to identify search parameters that are relevant to the identified context or subject of discussion between the customer and the customer service representative. For example, exemplary search parameters that may be extracted from the converted text data may include one or more of a customer ID, customer name, serial number or order number related to a product or service that the customer has purchased, date of purchase or date of provision of service to the customer, date of any prior complaint or call made by the customer, invoice numbers of any invoices issued to the customer, amount of money paid by the customer of the concerned product or services etc.

In an embodiment, the data analytics engine(s) may be configured to extract search parameters based on one or more predefined search parameter extraction rules or predefined search parameter extraction algorithms. In another embodiment, the data analytics engine(s) may comprise machine learning based or neural network based analytics engines that may be configured to extract search parameters based on linguistic analysis algorithms and one or more domain specific ontologies.

Step 606 comprises receiving at the service interface server 212, one or more customer records that have been retrieved from a database of customer records, and that correspond to the customer whose voice data has been received at step 602. The retrieval of customer records from a database of customer records is based on determining that data parameter(s) within the retrieved customer records match one or more of the search parameters that have been extracted at step 604. Stated differently, step 606 may be understood as involving a search of one or more customer record databases for customer records that correspond to the customer whose voice data has been received at step 602, and which customer records have data that match one or more of the search parameters that have been extracted at step 604.

Taking an example of a customer who calls a customer helpline in connection with a dispute regarding a credit card bill, the analysis of converted text data at step 604 may result in generation of exemplary search parameters "credit card bill" (subject of the call), "MasterCard" (credit card type), "pppp-qqqq-rrrr-ssss" (credit card number), "September 2018" (period to which the disputed credit card bill corresponds, "Line Item No. X" (the disputed line item in the credit card bill). In this example, at step 606, customer records within a customer record database may be searched for customer records that correspond to the calling customer and which satisfy one or more of the above extracted search parameters. In a successful search and retrieval, a search based on the above search parameters should result in identification of at least the disputed credit card bill, which identified credit card bill may be retrieved from the database of customer records and transmitted to/received at the service interface server 212.

As will be discussed in more detail in connection with FIGS. 7 and 8, the database of customer records may comprise databases within or coupled with one or both of client terminal 204 and service interface server 212.

Step 608 thereafter comprises displaying the customer records that have been received at step 606, on a display linked to a customer service representative interface terminal 208.

It would be understood from the above discussion that by converting speech data to voice data, extracting search parameters from the converted voice data, retrieving customer records corresponding to the extracted search parameters and displaying the retrieved customer records to a customer service representative 210 at CSR terminal 208, the method of FIG. 6 significantly optimizes the process of customer assistance—by ensuring that a customer service representative 210 is presented with customer records that are relevant to the call, in an uncomplicated workflow that does not require either the customer or the customer service representative to manually search through customer data records to identify customer records that are relevant to the call.

Figure 7:
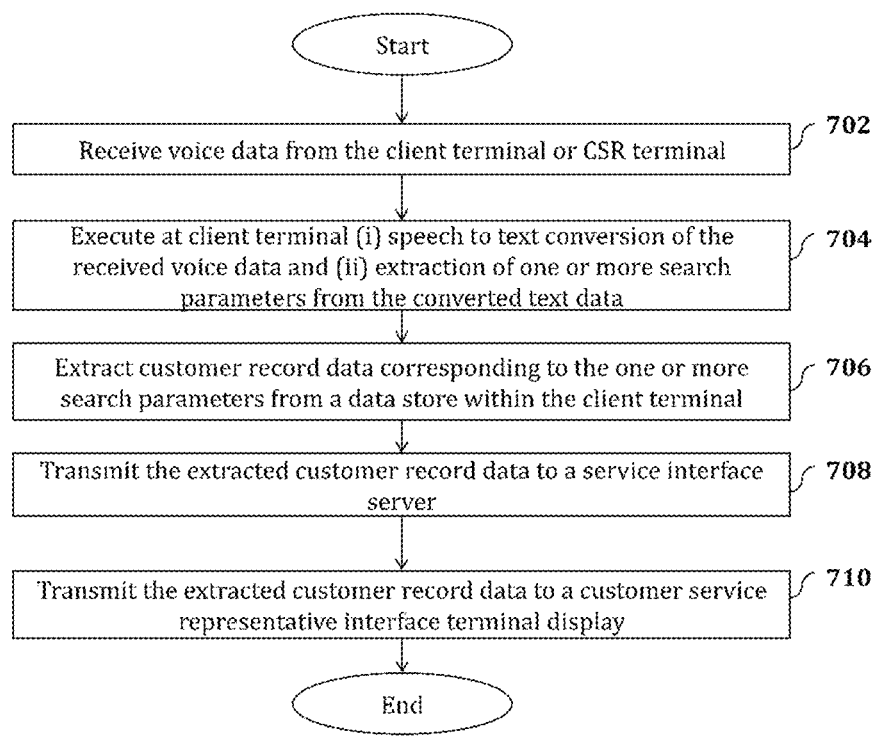
FIG. 7 is a flowchart illustrating a more specific embodiment of the method of FIG. 6, wherein the method is implemented at a client terminal and uses speech data to retrieve relevant customer records from a data store within the client terminal for display to a customer service representative.
Figure 8:
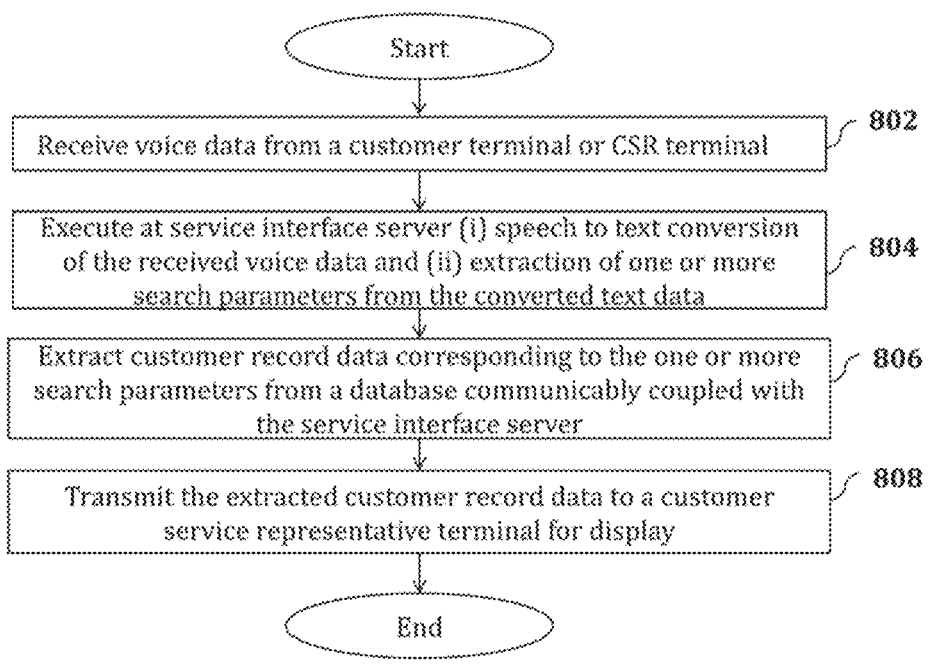
FIG. 8 is a flowchart illustrating another specific embodiment of the method of FIG. 6, wherein the method is implemented at a service interface server and uses speech data to retrieve relevant customer records from a data store associated with the service interface server for display to a customer service representative.

FIGS. 7 and 8 hereinbelow discuss more specific embodiments of the method of FIG. 6.

FIG. 7 is a flowchart illustrating a more specific embodiment of the method of FIG. 6, for retrieving and providing relevant customer information to a customer service representative during a customer support session—wherein one or more of speech to text engine 406, data analytics engine 408 and customer records database 414 from which customer records are retrieved, are located within client terminal 204.

As in the case of FIG. 6, preliminary to the method steps of FIG. 7, customer 202 may initiate a voice call through client terminal 204 to a customer service number. The voice call may be transmitted over a voice network or as a VoIP call over a data network and may be routed to service interface server 212. Load balancer 310 within service interface server 212 routes the call to a particular customer service representative 210 or a particular CSR terminal 208 within a group of customer service representatives or CSR terminals—based on one or more load balancing routines. Session handler 308 thereafter completes a voice connection between client terminal 204 and CSR terminal 208 via service interface server 212. In embodiments where a customer is initiating an in-app voice call with a customer service representative, the customer may first require to log in to a customer service account created for that customer at service interface server 212—and in which case, the request for account login and subsequent account authentication procedures may be implemented through account login controller 416 within client terminal 416.

At step 702, subsequent to initiation of a voice call or VoIP call between customer 202 and customer service representative 210, processor 402 (within client terminal 204) receives voice data from one or more of client terminal 204 (i.e. voice data corresponding to the customer) and CSR terminal 208 (i.e. voice data corresponding to the customer service representative).

Step 704 comprises executing at client terminal 204 (*i*) speech to text conversion of the received voice data and (ii) extraction of one or more search parameters from the converted text data.

Implementation of speech to text conversion at client terminal 204 involves receiving the voice data at speech to text engine 406 within client terminal 204 and processing the voice data using processing capabilities of processor 402 and memory 412 for conversion to text data within client terminal 204. As discussed in connection with FIG. 6, speech to text engine may 406 may be configured to receive voice data, analyze such voice data, extract speech content from the received voice data, and convert the voice data to text data.

The converted text data may thereafter be transmitted for display on at least client terminal 204, and optionally via network interface 410 onward to CSR terminal 208. In specific embodiments, the speech to text conversion may be triggered or initiated in response to receiving a specific instruction for initiating the speech-to-text conversion through customer interface 404 of client terminal 204.

Thereafter at step 704, the converted text data is analyzed and one or more search parameters are extracted from the converted text data. The analysis of text data and extraction of search parameters from the converted text data may be implemented by data analytics engine 408 implemented within client terminal 204. In an embodiment, the data analytics engine 408 may be configured to identify one or more contexts or subjects of the discussion between the customer and the customer service representative, and to identify search parameters that are relevant to the identified context or subject of the discussion between the customer and the customer service representative. Examples of search parameters that may be extracted from the converted text data may include one or more of a customer ID, customer name, serial number or order number related to a product or service that the customer has purchased, date of purchase or date of provision of service to the customer, date of any prior complaint or call made by the customer, invoice numbers of any invoices issued to the customer, amount of money paid by the customer of the concerned product or services, identifiers relating to prior service records of the customer, etc.

In an embodiment, data analytics engine(s) 408 may be configured to extract search parameters based on one or more predefined search parameter extraction rules or predefined search parameter extraction algorithms. In another embodiment, the data analytics engine(s) 408 may comprise machine learning based or neural network based analytics engine(s) that may be configured to extract search parameters based on linguistic analysis algorithms and one or more domain specific ontologies.

Step 706 comprises extracting at client terminal 204, one or more customer records that have been retrieved from a customer records database 414 within client terminal 204, and which correspond to the customer whose voice data has been received at step 702. The retrieval of customer records from customer records database 414 is based on determining that data parameter(s) within the retrieved customer records match one or more of the search parameters that have been extracted at step 704. Accordingly, step 706 may be understood as involving a search through one or more records within customer record databases 414 for customer records that correspond to the customer whose voice data has been received at step 702, and which customer records have data that match one or more of the search parameters that have been extracted at step 704. In an embodiment, the customer record extraction at step 706 may additionally include extraction of customer data records stored in customer records database 306 within service interface server 212—which data extraction may be remotely achieved through one or more query-response communication sessions between service interface server 212 and client terminal 204—and may be implemented through the respective network interfaces 410, 312 and remote data exchange handlers 420, 324 implemented within each of client terminal 204 and service interface server 212.

In an embodiment of the invention, customer records database 414 may include any one or more data stores within client terminal 204 including repositories of emails, text messages, instant messenger notifications, electronic documents, photographs, videos and any other data records that may be maintained by a customer within client terminal 204. In an embodiment where client terminal 204 is a customer's mobile communication device, customer records database 414 may include any one or more non-transitory memories within the mobile communication device, which the customer uses to store any of emails, text messages, instant messenger notifications, photographs, videos, electronic documents and other data records. In certain embodiments, customer records database 414 may only include such data stores to which the customer has specifically allowed data analytics engine 408 access for the purposes of the present invention.

At step 708, one or more of the customer records extracted at step 706 are transmitted to service interface server 212. The customer records may be transmitted from client terminal 204 to service interface server 212 through the interaction of a first remote data exchange handler 420 implemented within client terminal 204 and a second remote data exchange handler 324 implemented within service interface server 212. The first and second remote data exchange handlers 420, 324 may be configured to enable data network based exchange of extracted customer records between client terminal 204 and service interface server 212. In one embodiment of the invention, remote data exchange handler 420 implemented within client terminal 204 may be configured to first display the customer records extracted at step 706 to the customer 202 at a display associated with client terminal 204 and to obtain through an interface associated with client terminal 204, prior customer approval for sharing such customer records with customer service representative 210. In this embodiment, only those extracted customer records that are specifically selected or approved by the customer for sharing with service interface server 212 are transmitted to service interface server 212 through the respective first and second remote data exchange handlers 402, 324.

Step 710 comprises transmitting the extracted customer records that have been received at service interface server 212 (at step 708) to a display on CSR terminal 208 for the purpose of displaying the extracted customer records to customer service representative 210 and to enable customer service representative 210 to view the relevant customer records and accordingly provide relevant/targeted customer assistance. In an embodiment of the invention, the step of transmitting the extracted customer records to CSR terminal 208 may be implemented by remote data exchange handler 324 that is implemented within service interface server 212.

Figure 9A:
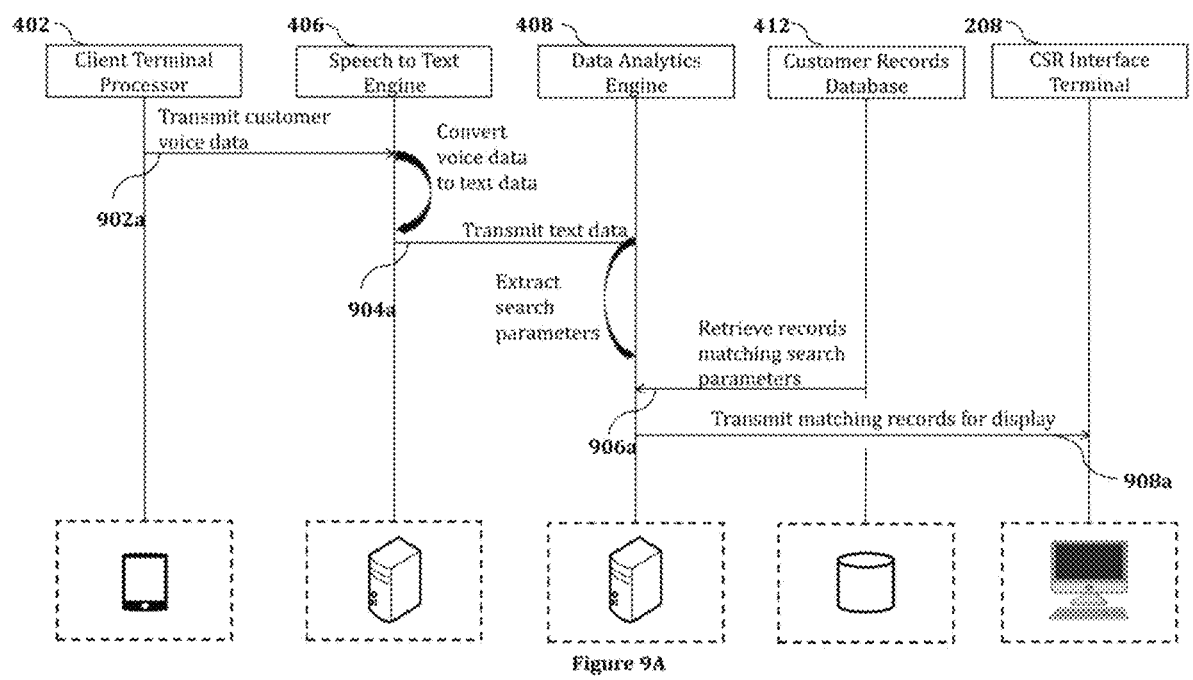
FIG. 9A is a communication flow diagram illustrating communication flows involved in the method of FIG. 7 of the present invention.

FIG. 9A is a communication flow diagram illustrating an exemplary communication flows involved in the implementation of the method of FIG. 7.

At step 902a, processor 402 within client terminal 204 transmits customer voice data to a speech to text engine 408 implemented within client terminal 204. At step 904a, speech to text engine 408 converts the voice data to text data and transmits the converted text data to data analytics engine 412 within client terminal 204. Data analytics engine 412 extracts search parameters from the converted text data (in accordance with step 706 of FIG. 7) and thereafter at step 906a retrieves customer records matching the extracted search parameters from customer records database 412. The retrieved matching customer records are transmitted at step 908a to CSR terminal 208 (in an embodiment through service interface server 212) for display to a customer service representative.

FIG. 8 is a flowchart illustrating an embodiment of the method for retrieving and providing relevant customer information to a customer service representative during a customer support session, that has been more generally discussed in connection with FIG. 6—wherein one or more of speech to text engine 316, data analytics engine 318 and customer records database 306 from which customer records are retrieved, are located within service interface server 212.

As in the case of FIG. 6, preliminary to the method steps of FIG. 8, customer 202 may initiate a voice call through client terminal 204 to a customer service number. The voice call may be transmitted over a voice network or as a VoIP call over a data network and may be routed to service interface server 212. Load balancer 310 within service interface server 212 routes the call to a particular customer service representative 210 or a particular CSR terminal 208 within a group of customer service representatives or CSR terminals—based on one or more load balancing routines. Session handler 308 thereafter completes a voice connection between client terminal 204 and CSR terminal 208 via service interface server 212. In embodiments where a customer is initiating an in-app voice call with a customer service representative, the customer may first require to log in to a customer service account created for that customer at service interface server 212—and in which case, the request for account login and subsequent account authentication procedures may be implemented through session handler 308 within client terminal service interface server 212.

At step 802, subsequent to initiation of a voice call or VoIP call between customer 202 and customer service representative 210, processor 302 (within service interface server 212) receives voice data from one or more of client terminal 204 (i.e. voice data corresponding to the customer) and CSR terminal 208 (i.e. voice data corresponding to the customer service representative).

Step 804 comprises executing at service interface server 212 (i) speech to text conversion of the received voice data and (ii) extraction of one or more search parameters from the converted text data.

Implementation of speech to text conversion at service interface server 212 involves receiving the voice data at speech to text engine 316 within service interface server 212, and processing the voice data using processing capabilities of processor 302 and memory 314 for conversion to text data within service interface server 212. As discussed in connection with FIG. 6, speech to text engine may 316 may be configured to receive voice data, analyze such voice data, extract speech content from the received voice data, and convert the voice data to text data.

The converted text data may thereafter be transmitted for display on at least CSR terminal 208, and optionally via network interface 312 onward to client terminal 204. In specific embodiments, the speech to text conversion may be triggered or initiated in response to receiving a specific instruction for initiating the speech-to-text conversion received at service interface server 212 from CSR terminal 208 through customer service representative interface 304.

Thereafter at step 804, the converted text data is analyzed and one or more search parameters are extracted from the converted text data. The analysis of text data and extraction of search parameters from the converted text data may be implemented by data analytics engine 318 implemented within service interface server 212. In an embodiment, data analytics engine 318 may be configured to identify one or more contexts or subjects of the discussion between the customer and the customer service representative, and to identify search parameters that are relevant to the identified context or subject of the discussion between the customer and the customer service representative. Examples of search parameters that may be extracted from the converted text data may include one or more of a customer ID, customer name, serial number or order number related to a product or service that the customer has purchased, date of purchase or date of provision of service to the customer, date of any prior complaint or call made by the customer, invoice numbers of any invoices issued to the customer, amount of money paid by the customer of the concerned product or services, identifiers relating to prior service records of the customer, etc.

In an embodiment, data analytics engine(s) 318 may be configured to extract search parameters based on one or more predefined search parameter extraction rules or predefined search parameter extraction algorithms. In another embodiment, the data analytics engine(s) 318 may comprise machine learning based or neural network based analytics engine(s) that may be configured to extract search parameters based on linguistic analysis algorithms and one or more domain specific ontologies.

Step 806 comprises extracting at service interface server 212, one or more customer records that have been retrieved from a customer records database 306 within (or communicably coupled with) service interface server 212, and which correspond to the customer whose voice data has been received at step 802. The retrieval of customer records from customer records database 306 is based on determining that data parameter(s) within the retrieved customer records match one or more of the search parameters that have been extracted at step 804. Accordingly, step 806 may be understood as involving a search through one or more records within customer record databases 306 for customer records that correspond to the customer whose voice data has been received at step 802, and which customer records have data that match one or more of the search parameters that have been extracted at step 804. In an embodiment, the customer record extraction at step 806 may additionally include extraction of customer data records stored in customer records database 414 within client terminal 204—which data extraction may be remotely carried out through one or more query-response communications between service interface server 212 and client terminal 204—and may be implemented through the respective network interfaces 410, 312 and remote data exchange handlers 420, 324 implemented within each of client terminal 204 and service interface server 212.

In an embodiment of the invention, customer records database 306 may include any one or more data stores within (or communicably coupled with) service interface server 212 including repositories of emails, text messages, instant messenger notifications, electronic documents, photographs, videos and any other data records that are associated with a customer or a customer account.

At step 808, one or more of the customer records extracted at step 806 are transmitted to CSR terminal 208 for display to customer service representative 210. The customer records may be transmitted from service interface server 212 through remote data exchange handler 324 implemented within service interface server 212—for the purpose of displaying the extracted relevant customer records to customer service representative 210 to enable customer service representative 210 to view the relevant customer records and accordingly provide relevant/targeted customer assistance.

In certain embodiments of the method of FIG. 8, session record logger 320 within service interface server 212 may be configured to enable customer service representative 210 to log and store session information at service interface server 212. The session information may comprise information relating to one or more details of a customer complaint or customer query, relevant customer records that have been identified and extracted in connection with the query, steps taken by customer service representative 210 to address the customer complaint or customer query—and any pending actionable(s) on the part of the customer service entity or customer service representative 210. The session information may in an embodiment be stored in customer records database 306. Customer notification handler 322 within service interface server 212 may additionally be configured to communicate all or relevant parts of such session information to client terminal 204—which communications may be received by notification handler 418 within client terminal 204, and may be displayed to customer 202 via appropriate notifications displayed on client terminal 204.

FIG. 9B is a communication flow diagram illustrating an exemplary communication flows in implementing the method of FIG. 8.

At step 902b, processor 402 within client terminal 204 transmits customer voice data to a speech to text engine 316 implemented within service interface server 212. At step 904b, speech to text engine 316 converts the voice data to text data and transmits the converted text data to data analytics engine 318 within service interface server 212. Data analytics engine 318 extracts search parameters from the converted text data (in accordance with step 806 of FIG. 8) and thereafter at step 906b retrieves customer records matching the extracted search parameters from customer records database 306. The retrieved matching customer records are transmitted at step 908b to CSR terminal 208 for display to a customer service representative.

It would be understood from the above discussion in connection with FIGS. 7 to 9B that by converting speech data to voice data, extracting search parameters from the converted voice data, retrieving customer records corresponding to the extracted search parameters and displaying the retrieved customer records to a customer service representative 210 at CSR terminal 208, the invention significantly improves the overall customer service experience—by ensuring that a customer service representative is presented with customer records that are relevant to the call, in an uncomplicated workflow to enable targeted and helpful customer service solutions or responses.

In a specific embodiment, the teachings of the present invention may be applied to a voice call based customer support solution that provides customer support for payment card or electronic payment based transaction services. It would be understood that embodiments of the solution may be implemented within an acquirer bank network infrastructure (i.e. within one or more servers associated with, or operated or controlled by or on behalf of an acquirer bank), an issuer bank network infrastructure (i.e. within one or more servers associated with, or operated or controlled by or on behalf of an issuer bank), a payment network (i.e. within one or more servers associated with, or operated or controlled by or on behalf of a payment network), or within a network infrastructure set up by a voice call based customer support service provider (i.e. within one or more servers associated with, or operated or controlled by or on behalf of the voice call based customer support service provider).

In this embodiment, the voice call based customer support solution may be configured or operated to provide customer support for payment card based or electronic payment account based transaction services.

As in the above described embodiments, customer 202 may initiate a voice call through client terminal 204 to a customer service number designated for voice call based customer support in connection with payment card or electronic payment based transaction services. The voice call may be transmitted over a voice network or as a VoIP call over a data network and may be routed to service interface server 212. Load balancer 310 within service interface server 212 routes the call to a particular customer service representative 210 or a particular CSR terminal 208 within a group of customer service representatives or CSR terminals—based on one or more load balancing routines. Session handler 308 thereafter completes a voice connection between client terminal 204 and CSR terminal 208 via service interface server 212. In embodiments where a customer is initiating an in-app voice call with a customer service representative, the customer may first require to log into to a customer service account created for that customer at service interface server 212—and in which case, the request for account login and subsequent account authentication procedures may be implemented through session handler 308 within client terminal service interface server 212.

Subsequent to initiation of a voice call or VoIP call between customer 202 and customer service representative 210, processor 302 (within service interface server 212) receives voice data from one or more of client terminal 204 (i.e. voice data corresponding to the customer) and CSR terminal 208 (i.e. voice data corresponding to the customer service representative).

The invention embodiment thereafter involves execution of the steps of (i) speech to text conversion of the received voice data and (ii) extraction of one or more search parameters from the converted text data—which steps may be in various embodiments be respectively implemented at one of service interface server 212 or client terminal 204. The extracted one or more search parameters may comprise any one or more of the search parameters extracted from the converted text data, including one or more of a customer ID, a payment card ID, an electronic payment account ID, cardholder name, electronic payment accountholder name, transaction statement number, transaction statement date, reward information associated with said payment card or electronic payment account, payment amount disputed by customer, and payment item disputed by customer.

The converted text data may thereafter be transmitted for display on at least CSR terminal 208, and optionally via network interface 312 onward to client terminal 204.

Thereafter, one or more customer records that have been retrieved either from a customer records database 306 within (or communicably coupled with) service interface server 212 or from a customer records database 414 within (or communicably coupled with) client terminal 204, and which correspond to the customer whose voice data has been received at service interface server 212. The retrieval of customer records from customer records database 306 or 414 is based on determining that data parameter(s) within the retrieved customer records match one or more of the search parameters that have been extracted at the earlier step. Accordingly, the step of customer record retrieval may be understood as involving a search through one or more records within customer record databases 306 or 414 for customer records that correspond to the customer whose voice data has been received at service interface server 212, and which customer records have data that match one or more of the search parameters that have been extracted.

One or more of the customer records that have been extracted are subsequently transmitted to CSR terminal 208 for display to customer service representative 210. The customer records may in an embodiment be transmitted from service interface server 212 through remote data exchange handler 324 implemented within service interface server 212—for the purpose of displaying the extracted relevant customer records to customer service representative 210 to enable customer service representative 210 to view the relevant customer records and accordingly provide relevant/targeted customer assistance.

Figure 10:
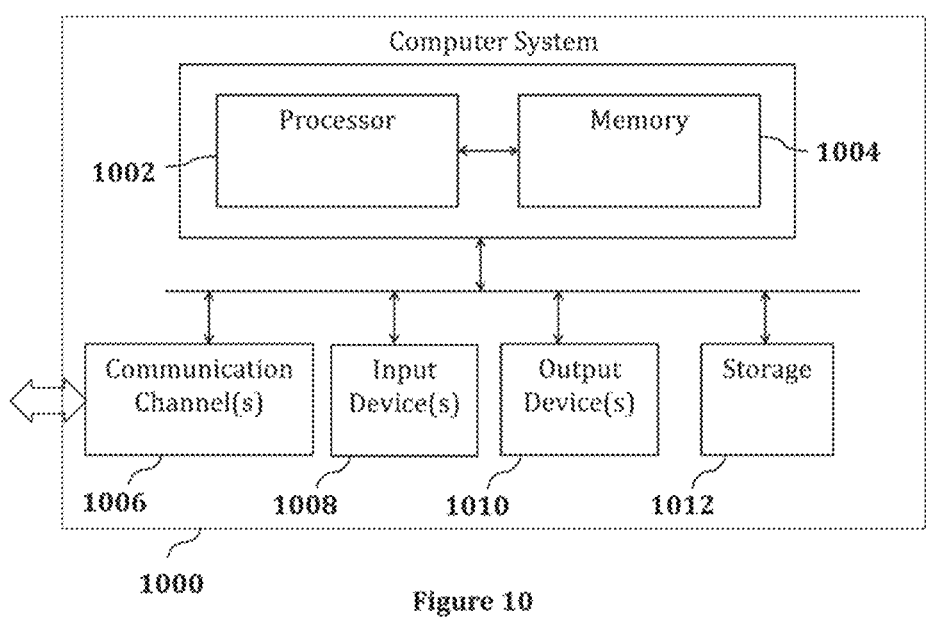
FIG. 10 is an exemplary computer system according to which various embodiments of the present invention may be implemented.

FIG. 10 illustrates an exemplary system 1000 for implementing the present invention.

System 1000 includes computer system 1002 which in turn comprises one or more processors 1004 and at least one memory 1006. Processor 1004 is configured to execute program instructions—and may be a real processor or a virtual processor. It will be understood that computer system 1002 does not suggest any limitation as to scope of use or functionality of described embodiments. The computer system 1002 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1002 in accordance with the present invention may include one or more servers, desktops, laptops, tablets, smart phones, mobile phones, mobile communication devices, tablets, phablets and personal digital assistants. In an embodiment of the present invention, the memory 1006 may store software for implementing various embodiments of the present invention. The computer system 1002 may have additional components. For example, the computer system 1002 may include one or more communication channels 1008, one or more input devices 1010, one or more output devices 1012, and storage 1014. An interconnection mechanism (not shown) such as a bus, controller, or network, interconnects the components of the computer system 1002. In various embodiments of the present invention, operating system software (not shown) provides an operating environment for various softwares executing in the computer system 1002 using a processor 1004, and manages different functionalities of the components of the computer system 1002.

The communication channel(s) 1008 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1010 may include, but is not limited to, a touch screen, a keyboard, mouse, pen, joystick, trackball, a voice device, a scanning device, or any another device that is capable of providing input to the computer system 1002. In an embodiment of the present invention, the input device(s) 1010 may be a sound card or similar device that accepts audio input in analog or digital form. The output device(s) 1012 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 1002.

The storage 1014 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1002. In various embodiments of the present invention, the storage 1014 may contain program instructions for implementing any of the described embodiments.

In an embodiment of the present invention, the computer system 1002 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1002. The method described herein is typically implemented as a computer program product, comprising a set of program instructions that is executed by the computer system 1002 or any other similar device. The set of program instructions may be a series of computer readable codes stored on a tangible medium, such as a computer readable storage medium (storage 1014), for example, diskette, CD-ROM, ROM, flash drives or hard disk, or transmittable to the computer system 1002, via a modem or other interface device, over either a tangible medium, including but not limited to optical or analogue communications channel(s) 1008. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The invention additionally provides a computer program product for implementing a voice call based customer support solution. The computer program product comprises a non-transitory computer usable medium having a computer readable program code embodied therein, the computer readable program code comprising instructions for implementing within a processor based computing system, the steps of (i) receiving voice data from a customer through a client terminal, (ii) converting the received voice data to text data, (iii) extracting one or more search parameters from the converted text data, wherein said extracted search parameters are based on at least one of a context or a subject identified from the converted text data, (iv) retrieving from a customer record database, at least one customer record that matches the extracted one or more search parameters, and (v) transmitting the retrieved at least one customer record to a customer service representative terminal for display to a customer service representative.

Based on the above, it would be apparent that the present invention offers an optimized customer support solution which—by converting speech data to voice data, extracting search parameters from the converted voice data, retrieving customer records corresponding to the extracted search parameters and displaying the retrieved customer records to a customer service representative at a CSR terminal—significantly improves the overall customer service experience and ensures that a customer service representative is presented with customer records that are relevant to the call.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method for implementing a voice call based customer support solution, comprising implementing within a processor based computing system, the steps of:
    receiving voice data from a customer through a client terminal;
    converting the received voice data to text data;
    extracting one or more search parameters from the converted text data, wherein said extracted search parameters are based on at least one of a context or a subject identified from the converted text data;
    retrieving from a customer record database, at least one customer record that matches the extracted one or more search parameters; and
    transmitting the retrieved at least one customer record to a customer service representative terminal for display to a customer service representative.

2. The method as claimed in claim 1, wherein the customer record database is located within the client terminal, and:
    at least one of the steps of converting the received voice data to text data, extracting one or more search parameters from the converted text data, and retrieving at least one customer record from the customer record database is implemented within a service interface server that is in network communication with the client terminal; or
    at least one of the steps of converting the received voice data to text data, extracting one or more search parameters from the converted text data, and retrieving at least one customer record from the customer record database is implemented within the client terminal.

3. The method as claimed in claim 2, wherein the retrieved at least one customer record is transmitted to a customer service representative in response to receiving through the client terminal, prior customer approval for such transmission.

4. The method as claimed in claim 1, wherein the search parameters extracted from the converted text data comprise one or more of a customer ID, customer name, serial number or order number for a product or service, date of purchase, date of service provision, date of prior complaint, invoice number, and payment amount associated with the customer.

5. The method as claimed in claim 1, wherein:
    the voice call based customer support solution provides customer support for payment card based or electronic payment account based transaction services;
    the at least one customer record corresponds to a transaction record associated with a payment card or electronic payment account associated with said payment card based or electronic payment account based transaction services;
    the search parameters extracted from the converted text data comprise one or more of a customer ID, a payment card ID, an electronic payment account ID, cardholder name, electronic payment accountholder name, transaction statement number, transaction statement date, reward information associated with said payment card or electronic payment account, payment amount disputed by customer, and payment item disputed by customer; and
    the step of retrieving at least one customer record from the customer record database is implemented within the client terminal.

6. A voice call based customer support system, comprising a processor based system configured to:
   receive voice data from a customer through a client terminal;
   convert the received voice data to text data;
   extract one or more search parameters from the converted text data, wherein said extracted search parameters are based on at least one of a context or a subject identified from the converted text data;
   retrieve from a customer record database, at least one customer record that matches the extracted one or more search parameters; and
   transmit the retrieved at least one customer record to a customer service representative terminal for display to a customer service representative.

7. The voice call based customer support system as claimed in claim 6, wherein the processor based system comprises a server that is in network communication with the client terminal, the server including at least one of:
   a speech to text engine configured for converting the received voice data to text data; and
   a data analysis engine configured for extracting one or more search parameters from the converted text data, and retrieving at least one customer record from the customer record database.

8. The system as claimed in claim 6, wherein:
   the customer record database is located within the client terminal;
   the client terminal is configured for one or more of converting the received voice data to text data, extracting one or more search parameters from the converted text data, and retrieving at least one customer record from the customer record database implemented within said client terminal; and
   the processor based system is configured to transmit the retrieved at least one customer record to a customer service representative in response to receiving through the client terminal, prior customer approval for such transmission.

9. The voice call based customer support system as claimed in claim 8, wherein the processor based system is configured such that the search parameters extracted from the converted text data comprise one or more of a customer ID, customer name, serial number or order number for a product or service, date of purchase, date of service provision, date of prior complaint, invoice number, and payment amount associated with the customer.

10. The voice call based customer support solution as claimed in claim 6, wherein:
   the voice call based customer support solution is configured to provide customer support for payment card based or electronic payment account based transaction services;
   the at least one customer record corresponds to a transaction record associated with a payment card or electronic payment account associated with said payment card based or electronic payment account based transaction services;
   the search parameters extracted from the converted text data comprise one or more of a customer ID, a payment card ID, an electronic payment account ID, cardholder name, electronic payment accountholder name, transaction statement number, transaction statement date, reward information associated with said payment card or electronic payment account, payment amount disputed by customer, and payment item disputed by customer; and
   the step of retrieving at least one customer record from the customer record database is implemented within the client terminal.

\* \* \* \* \*